United States Patent Office 3,024,998
Patented Mar. 13, 1962

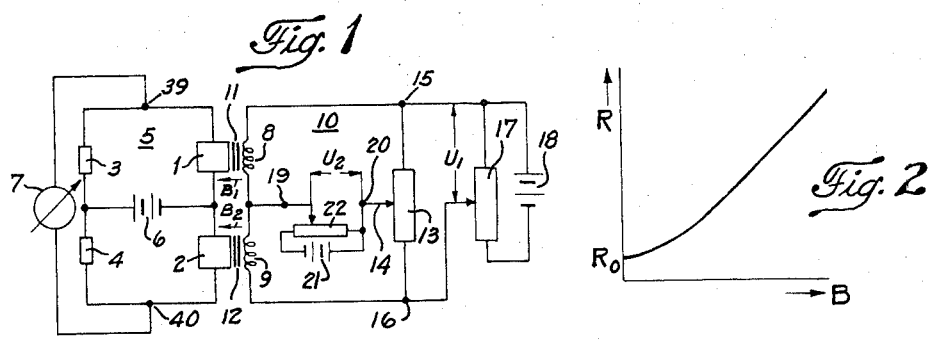

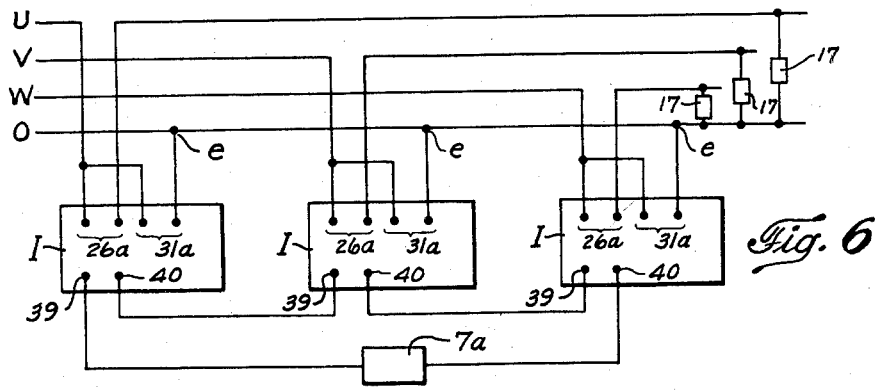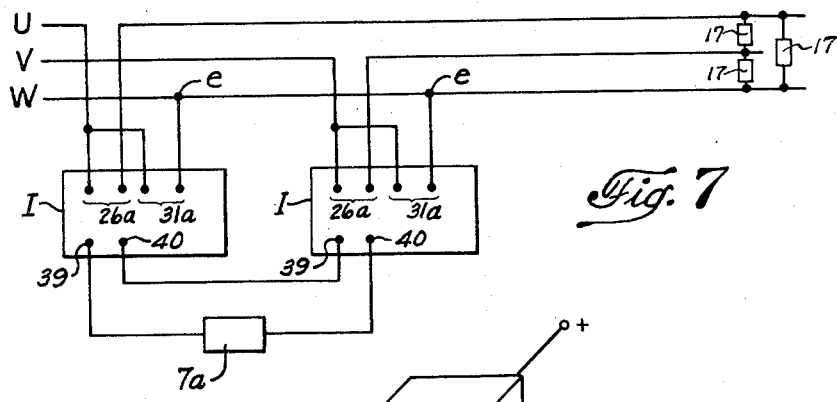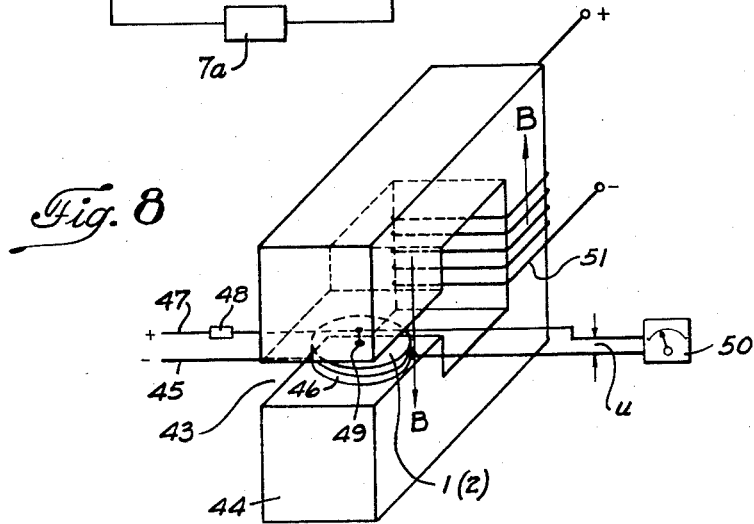

3,024,998
MULTIPLIERS WITH MAGNETIC RESPONSIVE RESISTANCE
Sua For Sun, Zurich, Switzerland, assignor to Landis & Gyr, A.G., Zug, Switzerland, a body corporate of Switzerland
Filed Apr. 4, 1960, Ser. No. 19,812
Claims priority, application Switzerland Apr. 25, 1959
11 Claims. (Cl. 235—194)

This invention relates to computing elements and more particularly to multipliers (or dividers) which utilize the effects which occur under the influence of a magnetic field on a resistance member through which a current is flowing.

In such devices a distinction is made between those in which the action depends on the Hall effect and those in which the resistance variation occurring at the resistance member is used.

Objects and advantages of the invention will be set forth in part hereinafter and in part will be obvious herefrom, or may be learned by practice with the invention, the same being realized and attained by means of the instrumentalities and combinations pointed out in the appended claims.

In multiplying devices of the first-mentioned type above, the voltage (Hall voltage) which appears at two electrodes arranged laterally on the resistance member (Hall electrodes), is proportional to the product of the current (control current) and the magnetic induction, provided that the dimensions of the resistance member (Hall generator) have certain proportions. Thus products of factors can be formed if these are proportional to the control current and the magnetic induction. The linear relationship between the Hall voltage and the product of control current and magnetic induction is only present, however, when there is no load on the Hall generator, that is to say when no Hall current is taken off through the Hall electrodes. If this is not the case, the voltage at the Hall electrodes is determined not only by the product of control current and induction but also by the particular value of the internal Hall resistance which in turn depends on the magnetic induction. The unfavorable influence of the dependence of the internal Hall resistance on the magnetic induction appears in a particularly disturbing manner in Hall generators of indium antimonide or indium arsenide, the use of which would otherwise be particularly desirable, because of their comparatively high carrier mobility, in order to increase the otherwise very low loading capacity of the Hall generator. In addition to this, the deviation from the above-mentioned linear relationship, as a result of the internal Hall resistance depending on the magnetic field, is the greater the better the matching between the value of the internal Hall resistance with a magnetic field of zero and that of the load resistance in the Hall circuit, that is to say the greater the power the Hall generator can deliver. A further disadvantage is the fact that with the magnetic field at zero, a voltage depending on the control current still appears because a precisely symmetrical arrangement of the Hall electrodes cannot be obtained in practice. This voltage, which is superimposed on the Hall voltage with inductions other than zero, likewise detracts from the proportionality between the Hall voltage and the product of control current and the magnetic induction. If it is desired to keep strictly to this proportionality, the above-mentioned disturbing influences necessitate the taking of measures for their elimination which involve considerable additional expense. In addition, Hall generators require comparatively high inductions if their output is to be any use. Their efficiency, that is to say the ratio between output and input power, actually decreases in proportion to the square of the induction. A further disadvantage is the fact that both the Hall constant and the specific resistance of the Hall generator are dependent on temperature but not to the same extent. Consequently the dependence on temperature cannot be compensated to an optimum for both the said factors at once without extensive temperature compensation.

In the devices which use the resistance variation, occurring under the influence of a magnetic field, of a resistance member, the side effects outlined above do not make a disturbing appearance because here the Hall circuit is absent.

The known devices of this type have the disadvantage of working with comparatively high inductions. This derives from the fact that the characteristic curve which represents the relationship between the resistance and the magnetic induction, only runs substantially linearly with relatively high induction values. For example, when so-called Corbino discs of indium antimonide are used, the said relationship only becomes substantially linear at induction values about about 5000 Gauss. Magnetic fields with such high inductions therefore require relatively large magnets to produce them, and the relatively small air gap which is dependent on the magnetic field and in which the resistance member is accommodated, is difficult to produce with sufficient tolerance. A multiplication device has been proposed which would permit working with comparatively low induction values. Work is then carried on in that part of the said characteristic curve in which the resistance is proportional to the square of the induction. According to this proposal, two resistance members which are dependent on the magnetic field, and two additional resistors, are arranged in a measuring bridge which is fed with current. A measuring device which measures the current in the bridge diagonals, is provided in the bridge diagonals between the two points at which the resistance members dependent on the magnetic field are connected together. If care is taken to ensure that magnetic fields, the strengths of which are proportional to the sum of or the difference between the two multiplicands, act on the resistance members, the reading of the measuring device is a gauge of their product. The magnetic field for each resistance member is produced by a coil or, according to another proposed construction, by a live conductor passing through the resistance member. Both constructions have the disadvantage that the current intensity necessary to produce a magnetic field of a specific strength is comparatively great, particularly in the latter construction. Moreover, this known proposal does not offer any solution to the problem of how to produce two magnetic fields, the strength of which is equal to the value $(x+y)$ or $(x-y)$ when $x$ any $y$ are the factors of the product $xy$ sought. The invention is based on recognition of the fact that, if work is carried on with comparatively low inductions, for example of the order of magnitude of not more than 4000 Gauss, magnet cores and coils of smaller dimensions, and moreover magnet cores of magnetic oxide material such as ferrite cores, which would be driven into the saturation range with the usual relatively high inductions, can be used to produce the magnetic fields. When such magnetic materials are used, the advantage is obtained that the air gap, in which the resistance member which is dependent on the magnetic field is accommodated, can be ground accurately to size by a simple grinding operation without weakening the magnetization.

The invention relates to a multiplying device wherein two magnetic fields are obtained, in a simple manner, the strengths of which are proportional to the sum of, or the difference between, the electrical voltages representing the multiplicands. It relates to a multiplying device for the multiplication of multiplicands represented by electric signals, using the Gauss effect, that is to say the resistance variation which occurs under the influence of a magnetic field, of a resistance member which is dependent on a magnetic field, which multiplying device comprises a measuring bridge which is fed with direct current and which consists of two identical resistance members which are dependent on magnetic fields and two resistors which have a higher resistance than the resistance members, and is characterized in that allocated to the measuring bridge is an energizing circuit which consists of two series-connected energizing windings each of which influences one of the two resistance members which are dependent on the magnetic field and a circuit which is connected in parallel with said windings and contains a tapped impedance, one of the two voltages representing the multiplicands being connected across the series-connected windings and the other being connected between the junction of the energizing windings and the tapped point of the impedance.

The invention consists in the novel parts, constructions, arrangements, combinations and improvements herein shown and described.

Some embodiments of the subject of the invention are illustrated by way of example in the accompanying drawings of which:

FIGURE 1 shows a multiplying device for the multiplication of two multiplicands represented by direct-current voltages;

FIGURE 2 is a graph;

FIGURE 3 shows a multiplying device for finding the active power in alternating-current mains;

FIGURE 4 shows an embodiment of a measuring bridge;

FIGURE 5 shows another embodiment of a multiplying device;

FIGURES 6 and 7 show a circuit arrangement for measuring power in a multiconductor alternating-current system; and FIGURE 8 shows the arrangement and circuit of a resistance dependent on magnetic fields.

In FIGURE 1, two resistance members which are dependent on the magnetic field are indicated at 1 and 2, and are combined with the resistors 3 and 4 to form a measuring bridge 5 which is fed from a constant-voltage source of direct-current voltage, for example a battery 6. A direct-current instrument 7 is connected into the output diagonal of the measuring bridge and measures its output voltage which at the same time forms the output voltage of the multiplying device. The resistance members 1 and 2 are subject to the influence of magnetic fields which are produced by series-connected energizing windings 8 and 9 of an energizing circuit 10. These energizing windings are on magnet cores 11, 12 which comprise air gaps in which the resistance members 1 and 2 are accommodated. The magnet cores 11, 12 are preferably made of a magnetic oxide material such as one of the magnetic materials known as ferrites. The energizing circuit is supplemented by a potentiometer 13 the tap 14 of which divides the resistance into two parts. Applied to the input terminals 15, 16 of the energizing circuit 10 is a direct-current voltage $U_1$ which represents the first multiplicand and which is taken off from a potentiometer 17 which is fed by the battery 18. Another direct-current voltage $U_2$, which represents the second multiplicand, is applied to the input terminals 19, 20 and is taken off from a potentiometer 22 fed from a battery 21. The currents flowing in the two energizing windings 8 and 9 and hence also the magnetic fields acting on the resistance members 1 and 2, are proportional, in the arrangement illustrated, to the sum $$\left(U_2+\frac{U_1}{2}\right)$$

and the difference $$\left(U_2-\frac{U_1}{2}\right)$$

of the voltages appearing at the inputs 19, 20 and the resistance sections of the potentiometer 13 situated between the tap 14 and the terminal 15 or between the tap 14 and the terminal 16. The induction of the two magnetic fields influencing the resistance members 1 and 2 may be represented by $$B_1=k_B\cdot\left(U_2+\frac{U_1}{2}\right) \text{ or } B_2=k_B\cdot\left(U_2-\frac{U_1}{2}\right)$$

in which equations $k_B$ is a proportionality constant. For low values of the induction, the relationship between the resistance R and the induction B is illustrated in the graph in FIGURE 2 for the resistance members 1 and 2 and may be expressed by the formula $$R=R_0+mB^2$$

In this expression R is the resistance of the resistance member dependent on the magnetic field, $R_0$ is its resistance with the induction $B=0$, $m$ is a proportionality constant and B the induction. The resistances $R_1$, $R_2$ of the resistance members 1 and 2, with the inductions $B_1$ and $B_2$ respectively therefore amount to:

$$R_1=R_0+mB_1^2$$

and $$R_2=R_0+mB_2^2$$

Thus $$R_1-R_2$$
$$=m(B_1^2-B_2^2)=m\left[k_B^2\left(U_2+\frac{U_1}{2}\right)^2-k_B^2\left(U_2-\frac{U_1}{2}\right)^2\right]$$
$$=mk_B^2\left[\left(U_2^2+U_2U_1+\frac{U_1^2}{4}\right)-\left(U_2^2-U_2U_1+\frac{U_1^2}{4}\right)\right]$$
$$R_1-R_2=2mk_B^2U_1U_2$$

Thus the difference in resistance $R_1-R_2$ is a gauge of the product of the multiplicands represented by the direct-current voltages $U_1$ and $U_2$. Since the resistance values of the resistors 3 and 4 are very high in comparison with those of the resistance members 1 and 2, the current flowing through the latter can be regarded as constant. The difference measured by the voltmeter 7 between the voltages across the resistance members 1 and 2 is therefore a gauge for the difference in resistance $R_1-R_2$ and hence for the product $U_1U_2$.

FIGURE 3 illustrates a multiplying device for finding the active power in a single-phase alternating-current main 23. The circuit differs from that of FIGURE 1 in that instead of the potentiometer 13, the secondary winding 24 of a transformer 25 is connected to the terminals 15, 16 of the energizing circuit 10. The primary winding 26 of this transformer is connected in series with a load 27 by way of current terminals 26a and is traversed by the load current $i$. Connected between the center tap 28 of the secondary winding 24 of the transformer 25 and the junction 19 of the two energizing windings 8 and 9, is the secondary winding 29 of a transformer 30, the primary winding 31 of which is connected to the mains voltage $e$.

The transformers 25 and 30 are provided not only to produce input voltages suitable for the multiplying device but at least one of them also serves to prevent a short-circuit of the current arm situated between the terminals 15, 16. Such a short-circuit would, in fact, occur if the input terminals 19, 20 and 15, 16 were connected directly to the mains voltage $e$.

The measuring bridge 5 is fed through a bridge rectifier 33 from a transformer 32 the primary winding 31b of which is connected to the mains voltage $e$ by way of mains voltage terminals 31a. An RC combination 34, 35 ensures the smoothing of the direct-current voltage while a Zener diode 36 serves to maintain it constant. If the demands as regards constant voltage are high, a plurality of Zener diodes may be used. In the arrangement of FIGURE 3 only the direct-current voltage component of the alternating current voltage which appears at the resistance members 1, 2, and which is superimposed on a direct-current voltage, is measured at the voltmeter 7, because only this direct-current voltage component delivers a value proportional to the product $e.i$. If provision is made for one of the input voltages effective at the terminals 19, 20 and 15, 16 to receive an additional phase displacement of 90°, the circuit shown in FIGURE 3 can also be used to measure the reactive power. In this case, the direct current voltage component can be measured with a measuring instrument having its zero point in the middle of the scale to measure the reactive power both with a leading and with a lagging load current.

If a direct-current voltage which is proportional to the voltage of an alternating-current mains supply is applied to the input terminals 19, 20 of the device shown in FIGURE 1 and a second direct-current voltage which is proportional to the current flowing in the alternating-current mains is applied to the input terminals 15, 16, the apparent power of the single-phase mains in question can be measured with the device.

In order to measure the power in multiconductor alternating-current mains, a plurality of multiplying devices as shown in FIGURE 1 should be provided. FIGURES 6 and 7 each show a circuit arrangement for measuring power in a multiconductor alternating-current system, FIGURE 6 representing a four-conductor three-phase alternating current main and FIGURE 7 a three-conductor two-phase alternating-current main. As may be seen from these figures, as many multiplying devices are required for this as there are phases. The inputs, consisting of current terminals 26a and voltage terminals 31a, of each multiplying device I allocated to a specific phase conductor UVW should then be connected to a voltage which is proportional to the voltage between the latter and a neutral conductor O. The outputs 39, 40 of the several multiplying devices are connected in series with a common indicator 7a. The sum of the direct-current components present at the outputs of the multiplying devices then forms a gauge for the active, reactive or apparent power.

In order to be able to compensate for any differences between the resistance members 1 and 2 which are dependent on magnetic fields, a construction of the measuring bridge 5 as shown in FIGURE 4 is preferably used. The resistors 3 and 4 of the measuring bridge of FIGURE 1 are here replaced by a potentiometer 37, while a potentiometer 38 is arranged between the resistance members 1, 2 dependent on magnetic fields. The resistance values of the potentiometer 37 and 38 are of the order of magnitude of those of the resistors 3, 4 and of the resistance members 1, 2 respectively so that the bridge current is not influenced by variations in the resistance values of the resistance members 1, 2. Both potentiometers 37, 38 are wound with resistance wire which is insensitive to temperature. The potentiometers should be adjusted in such a manner that when magnetic fields of equal magnitude act on the resistance members 1, 2 the voltage at the output 39, 40 of the measuring bridge 5 is at a null. Apart from the measuring bridge 5, the energizing circuit 10 also requires some possibility of compensation so that the fields produced by the energizing coils 8 and 9 may be equal to one another. In the case of alternating-current signals, the circuit shown in FIGURE 5 may serve this purpose. In this case, variable balancing inductances 41 and 42 are connected in parallel with the energizing coils 8, 9.

As FIGURE 8 shows, the resistance 1 (2) dependent on magnetic field is centrally arranged in the gap 43 of the magnet 44. A conductor 45 is connected to its edge 46, and a conductor 47 to its center 49 by way of a resistance 48. The current traversing it depends in intensity on the magnitude of the resistance of the resistor, which in turn is determined by the strength of the magnetic field, so that with variable magnetic field strength B, the resistance of the field-dependent resistor is varied correspondingly. The voltage $u$ associated with the current $i$ can be read off on the voltmeter 50. The magnetic field is generated by the energizing winding 51 and its associated source of voltage. For clarity, the magnetic member has not been drawn laminated.

The invention is not restricted to the embodiments described by way of example but may be used also when certain favorable conditions for measuring the power, such as symmetrical loading, are present, which permit a simplification of the circuit. Thus in three-phase mains with equally-loaded phases, it is possible to manage with only one instead of two or three calculating devices. Apart from the advantages already mentioned, the multiplying devices according to the invention also have the advantage over other devices with semi-conductors of being able to deliver greater powers so that no amplifiers are necessary. In addition, electro-mechanical actuators, e.g., servo motors, are not required. Furthermore, the temperature compensation for the resistance members dependent on the magnetic field only has to allow for the temperature response of its specific resistance and can therefore be of optimum dimensions for this.

The invention in its broader aspects is not limited to the specific mechanisms shown and described but departures may be made therefrom within the scope of the accompanying claims without departing from the principles of the invention and without sacrificing its chief advantages.

What is claimed is:

1. A multiplying device using the Gauss effect for the multiplication of data comprising a plurality of magnetically responsive resistances, means for supplying said resistances, with a current, magnetic means in juxtaposition with said magnetically responsive resistances for subjecting said resistances to a magnetic field, a multi-loop circuit for energizing said magnetic means with a current responsive to the sum and difference of two quantities of said data and output means connected to said resistances for indicating said multiplication of said data.

2. A multiplier according to claim 1, in which said magnetically responsive resistances are operated in the square law region of their resistance-induction characteristics.

3. A multiplier according to claim 1, in which said multi-loop circuit includes an impedance branch connected across said magnetic means and energized by a signal representing one of said quantities and a pair of terminals connected respectively at an intermediate point of said branch and to said magnetic means and energized by a signal representing the other of said quantities.

4. A multiplier according to claim 1, in which said current supply means comprise a bridge circuit, across the output diagonal of which said multiplication of said data is indicated.

5. A multiplying device using the Gauss effect, particularly for the multiplication of multiplicands represented by electrical signals, which multiplying device comprises a measuring bridge which is fed with direct current and which includes two identical resistance members which are magnetic-field dependent and of two resistance elements which have a high resistance value in comparison with said resistance members, characterized in that allocated to said measuring bridge is an energizing circuit comprising two series-connected energizing windings each of which influences one of said two resistance members and of a circuit which is connected in parallel with said windings and which includes an impedance divider, one of two voltages representing the multiplicands being connected to said series-connected energizing windings and the other being connected between said energizing windings and an intermediate point of said divider.

6. A multiplying device as claimed in claim 5, characterized in that said impedance divider comprises a potentiometer.

7. A multiplying device as claimed in claim 5, characterized in that said impedance divider comprises the secondary winding of a transformer, the primary winding of which is connected in series with a load, and a secondary winding of a second transformer which is connected between said energizing windings and an intermediate point of said first-mentioned secondary winding.

8. A multiplying device as claimed in claim 5, characterized in that said direct-current energizing voltage is supplied to said measuring bridge through two potentiometers.

9. A multiplying device as claimed in claim 5, characterized in that at least one balancing inductance is provided which is connected in parallel with one of said energizing windings in said energizing circuit.

10. A system of multiplying devices as claimed in claim 5, for measuring the active, reactive or apparent power in plural phase power mains, characterized in that outputs of a plurality of said multiplying devices are connected in series with an instrument which indicates the sum of the individual said output voltages.

11. A multiplying device as claimed in claim 5, characterized in that said energizing windings are each mounted on a magnet core of magnet oxide material.

No references cited.